(12) United States Patent
Bast

(10) Patent No.: US 11,260,721 B2
(45) Date of Patent: Mar. 1, 2022

(54) MOTOR VEHICLE

(71) Applicant: Bayerische Motoren Werke Aktiengesellschaft, Munich (DE)

(72) Inventor: Stefan Bast, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 210 days.

(21) Appl. No.: 15/865,808

(22) Filed: Jan. 9, 2018

(65) Prior Publication Data

US 2018/0126819 A1 May 10, 2018

Related U.S. Application Data

(63) Continuation of application No. PCT/EP2016/065720, filed on Jul. 4, 2016.

(30) Foreign Application Priority Data

Jul. 10, 2015 (DE) ..................... 10 2015 212 972.1

(51) Int. Cl.
*B60H 1/00* (2006.01)
*B60H 1/24* (2006.01)
(Continued)

(52) U.S. Cl.
CPC ..... *B60H 1/00407* (2013.01); *B60H 1/00592* (2013.01); *B60H 1/243* (2013.01);
(Continued)

(58) Field of Classification Search
CPC ............ B60H 1/00407; B60H 1/00592; B60H 1/243; B60H 1/246; B60H 1/34;
(Continued)

(56) References Cited

U.S. PATENT DOCUMENTS 6,213,865 B1   4/2001   Odebrecht
6,341,814 B1   1/2002   Hoenninger et al.
(Continued)

FOREIGN PATENT DOCUMENTS

CN   101372199 A   2/2009
DE   199 08 499 C1   4/2000
(Continued)

OTHER PUBLICATIONS

Ringleschwender, Hermann, DE10200613549 Translation.pdf, "Wind protection device for a convertable", Sep. 2007, pp. 1-9.*
(Continued)

*Primary Examiner* — Edelmira Bosques
*Assistant Examiner* — Ryan L Faulkner
(74) *Attorney, Agent, or Firm* — Crowell & Moring LLP

(57) ABSTRACT

A motor vehicle is provided in which cold air is prevented from flowing forwards from the rear region to the front seats when travelling with an open top. At least one air outlet opening or air outlet nozzle is formed at a rear end of the center console, through which air outlet opening or air outlet nozzle warm air can flow out upwards and/or forwards between the two backrests of the two front seats. Further air outlet openings are provided in the two opposite B body pillars, through which air outlet openings warm air can flow out forwards in the direction of the backrests of the front seats and/or in the transverse direction of the vehicle into the rear region.

4 Claims, 3 Drawing Sheets

(51) Int. Cl.
  *B60J 7/22* (2006.01)
  *B60J 5/04* (2006.01)
  *B60J 7/12* (2006.01)
  *B60N 2/01* (2006.01)
  *B62D 25/04* (2006.01)

(52) U.S. Cl.
  CPC .............. *B60H 1/246* (2013.01); *B60J 7/223* (2013.01); *B60J 5/04* (2013.01); *B60J 7/12* (2013.01); *B60N 2/01* (2013.01); *B62D 25/04* (2013.01)

(58) Field of Classification Search
  CPC ..... B60H 2001/3471; B60J 7/223; B60J 5/04; B60J 7/12; B60N 2/01; B62D 25/04
  USPC ........................................................ 454/143
  See application file for complete search history.

(56) References Cited

U.S. PATENT DOCUMENTS

| | | | |
|---|---|---|---|
| 2009/0038774 A1* | 2/2009 | Ogiso | B60H 1/245 165/42 |
| 2016/0167478 A1 | 6/2016 | Lee et al. | |

FOREIGN PATENT DOCUMENTS

| | | | |
|---|---|---|---|
| DE | 199 08 497 A1 | 9/2000 | |
| DE | 199 23 189 C1 | 11/2000 | |
| DE | 102006013549 A1 * | 9/2007 | ............... B60J 1/17 |
| DE | 10 2010 050 181 A1 | 5/2012 | |
| DE | 10 2011 122 050 A1 | 10/2012 | |
| DE | 10 2012 107 863 A1 | 2/2014 | |
| WO | WO 2014/193126 A1 | 12/2014 | |

OTHER PUBLICATIONS

International Search Report (PCT/ISA/210) issued in PCT Application No. PCT/EP2016/065720 dated Oct. 4, 2016 with English translation (six pages).

German-language Written Opinion (PCT/ISA/237) issued in PCT Application No. PCT/EP2016/065720 dated Oct. 4, 2016 (five pages).

German-language Search Report issued in counterpart German Application No. 10 2015 212 972.1 dated Jan. 29, 2016 with partial English translation (12 pages).

Chinese-language Office Action issued in counterpart Chinese Application No. 201680040141.3 dated Nov. 6, 2019 with English translation (12 pages).

* cited by examiner

MOTOR VEHICLE

CROSS REFERENCE TO RELATED APPLICATIONS

This application is a continuation of PCT International Application No. PCT/EP2016/065720, filed Jul. 4, 2016, which claims priority under 35 U.S.C. § 119 from German Patent Application No. 10 2015 212 972.1, filed Jul. 10, 2015, the entire disclosures of which are herein expressly incorporated by reference.

BACKGROUND AND SUMMARY OF THE INVENTION

The invention relates to a motor vehicle having a folding top or a roof cover which is movable from a closed position in which a vehicle interior is covered into a stowage position in which the vehicle interior is open to the top.

DE 199 08 499 C1 discloses a wind partition arrangement for open motor vehicles. The wind partition is oriented substantially vertically and covers the head restraint region behind the backrests of the vehicle seats arranged next to one another. Furthermore, the wind partition has a horizontally arranged covering part which covers a clearance between the wind partition and a rear wall of a passenger cell. Air outlet nozzles via which the head restraints can be impinged with warm air are provided in the covering part.

It is an object of the invention to provide a motor vehicle in which cold air is prevented from flowing forward from the rear region to the front seats when traveling with an open folding top.

This and other objects are achieved by a motor vehicle according to the invention having a folding top or a roof cover which is movable from a closed position in which a vehicle interior is covered into a stowage position in which the vehicle interior is open to the top.

The motor vehicle has a body with opposite side walls in each of which a door cutout opening is formed. A side door is pivotably arranged in the respective door cutout opening. The respective side wall has a (B) body pillar adjoining the side door.

Two front seats are arranged in the vehicle interior, wherein a front seat has a seat cushion, a backrest and possibly a head restraint. The two front seats are spaced apart from one another by a center console, wherein a rear region adjoins behind the front seats.

At least one air outlet opening or air outlet nozzle is advantageously formed at a rear end of the center console, through which air outlet opening or air outlet nozzle warm air can flow out upward and/or forward between the two backrests of the two front seats. In addition, air outlet openings are provided in the two opposite (B) body pillars, through which air outlet openings warm air can flow out forward in the direction of the backrests of the front seats.

In an advantageous embodiment, adjustable nozzles or the like are arranged in the present air outlet openings of the center console and the present air outlet openings in the two opposite (B) body pillars.

The air outlet nozzles situated in the air outlet openings are advantageously motor-adjustable in their position.

In an advantageous embodiment, the air outlet openings are connected to the present heating device and/or air-conditioning device and the control device and/or regulating device connected thereto.

Other objects, advantages and novel features of the present invention will become apparent from the following detailed description of one or more preferred embodiments when considered in conjunction with the accompanying drawings.

DETAILED DESCRIPTION OF THE DRAWINGS

Figure 1:
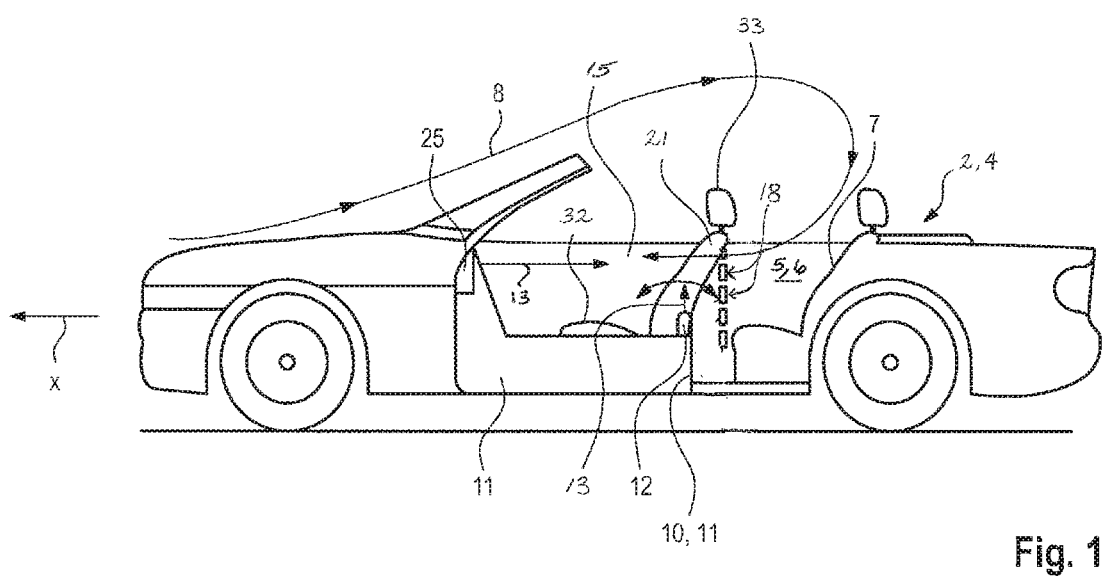
FIG. 1 is a side view of a partially sectioned motor vehicle with an open folding top.

FIG. 1 shows a motor vehicle 1 in which a folding top 2 is situated in a stowage position in a folding-top compartment or in a luggage compartment 4. Two front seats 9 are arranged in front of a rear region 6 in the vehicle interior. The two front seats 9 are spaced apart from one another by a center console 11. Each front seat 9 has a seat cushion 32, a backrest 21 and possibly a head restraint 33.

When the motor vehicle 1 travels with an open folding top in the direction of travel x in accordance with FIG. 1, an air space 5 in the rear region 6 between the two front seats 9 and the luggage compartment 4, or possibly present rear seats 7, cools down by virtue of an overpressure from above.

An air flow 8 created as the motor vehicle 1 travels is illustrated in FIG. 1 by a linear flow progression. The air flow 8 presses past the two front seats 9 from the rear region 6 in the direction of travel x. A respective person seated on one of the two front seats 9 is cooled by the air flow 8.

In the embodiment shown in FIG. 1, a pivotable air outlet nozzle 12, or a forwardly and/or upwardly directed console air outlet opening of a fan, is located at a rear end 10 of a center console 11, by which outflowing warm air 13 is provided.

Figure 2:
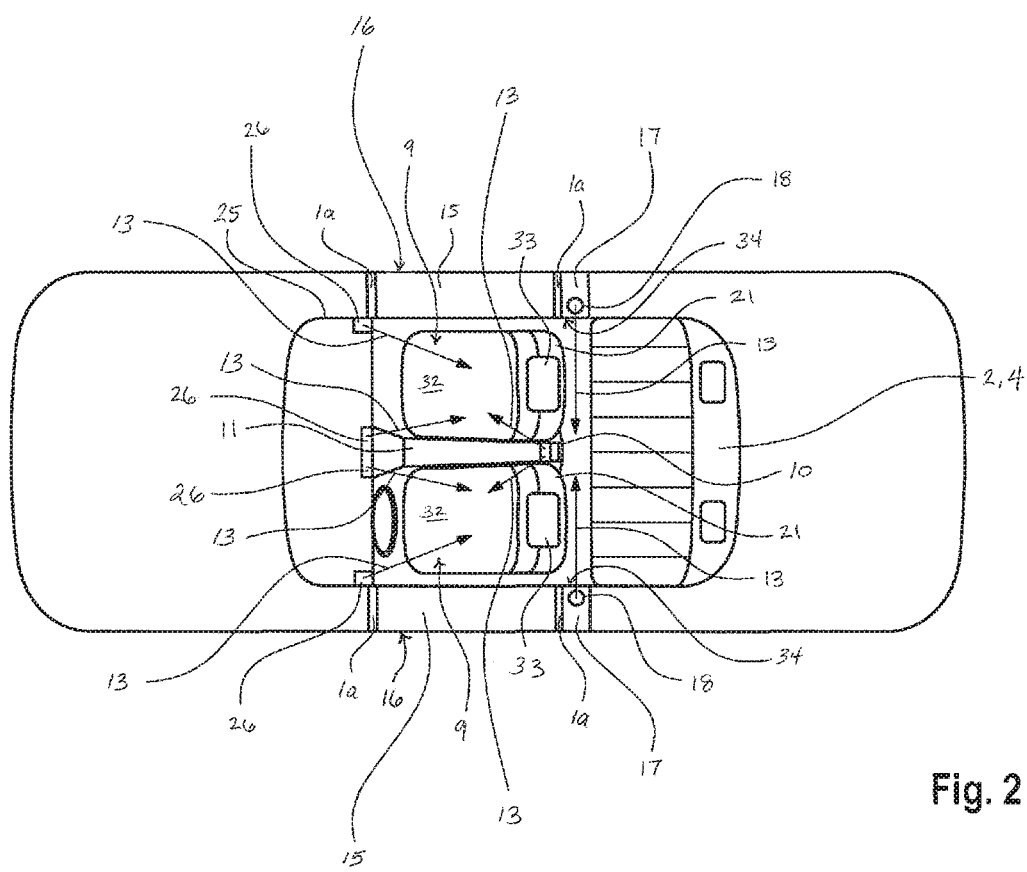
FIG. 2 is a view from above of the motor vehicle shown in FIG. 1.

As shown in FIG. 2, side walls 34 are formed on both sides of a body 1a of the motor vehicle 1. In the opposite side walls 34 there is formed a respective door cutout opening 16. A side door 15 is in each case pivotably arranged in the respective door cutout opening 16. The respective side wall 34 has a body pillar 17 adjoining the respective side door 15.

As shown in FIGS. 1 and 2, pillar air outlet openings 18 are formed in the respective body pillar 17. In one embodiment, the pillar air outlet openings 18 can be formed such that warm air 13 flows forward in the direction of a respective backrest 21 of the respective front seat 9.

In another embodiment, pillar air outlet openings 18 are provided via which warm air 13 flows in the vehicle transverse direction.

In a further embodiment, the pillar air outlet openings 18 can be provided, from which air flows forward and flows in the vehicle transverse direction. The air outlet openings can be provided with a respective ventilation louver.

The emerging warm air 13 at the console air outlet nozzles 12 on the center console 11 and the emerging warm air 13 at the pillar air outlet openings 18 on the body pillars 17 results in a "warm air curtain" which prevents cold ambient air of the head wind flowing forward from the rear region 6 past the backrests 21 of the front seats 9 or results in such forward-flowing cold air being heated.

In addition, the effect of preventing the cold ambient air of the head wind flowing forward from the rear region 6 past the backrests 21 of the front seats 9 can be boosted as a result of panel air outlet openings 26 present in an instrument panel 25, at the opposite ends of the instrument panel and in the center of the instrument panel at the level of the center console 11. Warm air can be thereby discharged in the direction of the respective front seat 9.

Figure 3:
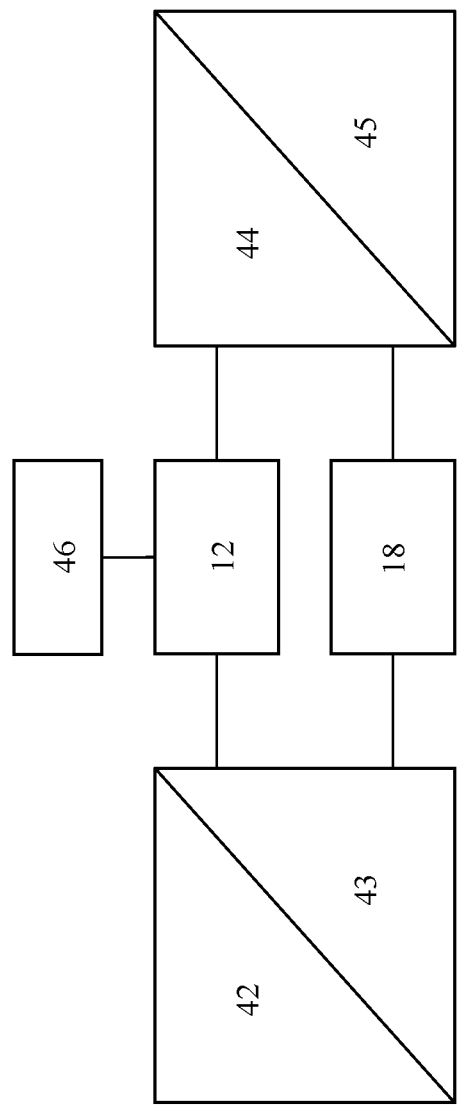
FIG. 3 is a schematic depiction of aspects of at least one embodiment.

As shown in FIG. 3, the console air outlet openings (or nozzles) 12 in the center console 11 and the present pillar air outlet openings 18 are connected to the present heating device 42 and/or air-conditioning device 43 and the control device 44 and/or regulating device 45 connected thereto. Also, as shown in FIG. 3, the adjustable nozzles may be driven by motor 46.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A motor vehicle in which a folding top is movable from a closed position covering a vehicle interior into a stowage position exposing the vehicle interior, the motor vehicle comprising:
    a vehicle body with opposite side walls in each of which a door cutout opening is located;
    a front side door pivotably arranged in each respective door cutout opening, wherein the respective side wall has a body pillar adjoining the front side door;
    two front seats spaced apart from one another via a center console, each front seat having a seat cushion and a backrest;
    a rear region adjoining behind the two front seats;
    at least one console air outlet opening located at a rear end of the center console, through which warmed air is flowable upward and/or forward between the backrests of the two front seats; and
    at least one pillar air outlet opening located in each opposing body pillar, through which warmed air, that is air warmed by the vehicle, is flowable forward in a direction of the backrests of the front seats and/or in a vehicle transverse direction into the rear region,
    wherein the warmed air from the at least one console air outlet opening and the at least one pillar air outlet opening forms a warmed-air-curtain that prevents ambient temperature air flow created by the vehicle traveling with folding top in the stowage position from flowing forward from the rear region to the front seats.

2. The motor vehicle according to claim 1, wherein the console air outlet openings and the pillar air outlet openings include adjustable nozzles.

3. The motor vehicle according to claim 2, wherein the adjustable nozzles are motor driven.

4. The motor vehicle according to claim 1, further comprising:
    an air-conditioning/heating unit and a corresponding control and/or regulating device coupled thereto, wherein the at least one console air outlet opening and the pillar air outlet openings are connected with the air-conditioning/heating unit.

* * * * *